US010681457B2

(12) United States Patent
Secall (10) Patent No.: US 10,681,457 B2
(45) Date of Patent: Jun. 9, 2020

(54) CLIP-ON MICROPHONE ASSEMBLY (71) Applicant: Sonova AG, Staefa (CH)

(72) Inventor: Marc Secall, Constantine (CH)

(73) Assignee: Sonova AG, Staefa (CH)

( * ) Notice: Subject to any disclaimer, the term of this patent is extended or adjusted under 35 U.S.C. 154(b) by 0 days.

(21) Appl. No.: 15/746,030

(22) PCT Filed: Jul. 27, 2015

(86) PCT No.: PCT/EP2015/067138
§ 371 (c)(1),
(2) Date: Jan. 19, 2018

(87) PCT Pub. No.: WO2017/016587
PCT Pub. Date: Feb. 2, 2017

(65) Prior Publication Data
US 2018/0249245 A1 Aug. 30, 2018

(51) Int. Cl.
H04R 3/00 (2006.01)
G01C 9/00 (2006.01)
(Continued)

(52) U.S. Cl.
CPC .............. H04R 3/005 (2013.01); G01C 9/00 (2013.01); G01P 15/18 (2013.01); G10L 25/78 (2013.01);
(Continued)

(58) Field of Classification Search
CPC ...... H04R 3/005; H04R 2410/00; G01C 9/00; G01P 15/18; G10L 25/78; G10L 25/93; G10L 2021/02165
See application file for complete search history.

(56) References Cited

U.S. PATENT DOCUMENTS 7,912,237 B2   3/2011   Fischer
8,150,063 B2   4/2012   Chen
(Continued)

FOREIGN PATENT DOCUMENTS

WO   2009049645 A1   4/2009
WO   2009049646 A1   4/2009
(Continued)

OTHER PUBLICATIONS

International Searching Authority, International Search Report and Written Opinion, PCT Patent Application PCT/EP2015/067138, dated Oct. 12, 2015, 7 pages.

Primary Examiner — Davetta W Goins
Assistant Examiner — Daniel R Sellers (57) ABSTRACT There is provided a clip-on microphone assembly comprising a clip-on mechanism (16) for attaching the microphone assembly (10) to the cloths of a user (11); at least three microphones (20, 21, 22) for capturing audio signals from the user's voice, the microphones defining a microphone plane; an acceleration sensor (32) for generating an orientation signal by sensing gravitational acceleration in at least two orthogonal dimensions, an audio signal processing unit (34) for producing an output audio signal (36) from the captured audio signals, comprising a beamformer unit (24) for processing the captured audio signals, in order to generate the output audio signal, in a manner so as to create an acoustic beam having a direction, a DOA unit (30) for determining the direction of arrival of sound by analyzing the captured audio signals; and a control unit (26) for controlling the beamforming unit, the control unit being adapted to determine an allowed angular sector (40) of the direction of the acoustic beam according to the orientation signal and to steer the direction of the acoustic beam within (Continued)

the allowed angular sector according to the determined direction of arrival.

19 Claims, 5 Drawing Sheets

(51) Int. Cl.
  *G01P 15/18* (2013.01)
  *G10L 25/78* (2013.01)
  *G10L 21/0216* (2013.01)
  *G10L 25/93* (2013.01)

(52) U.S. Cl.
  CPC .... *G10L 25/93* (2013.01); *G10L 2021/02165* (2013.01); *H04R 2410/00* (2013.01)

(56) References Cited

U.S. PATENT DOCUMENTS

| | | |
|---|---|---|
| 8,406,436 B2 | 3/2013 | Craven |
| 8,804,978 B2 | 8/2014 | Hayakawa |
| 2011/0038489 A1* | 2/2011 | Visser .................. G01S 3/8006 381/92 |
| 2011/0093091 A1 | 4/2011 | Rifkin |
| 2011/0158425 A1* | 6/2011 | Hayakawa ............ G01S 3/8083 381/92 |
| 2013/0064404 A1* | 3/2013 | Ridler .................. H04R 25/405 381/313 |
| 2013/0332156 A1 | 12/2013 | Tackin |
| 2014/0023199 A1 | 1/2014 | Giesbrecht |
| 2014/0093091 A1* | 4/2014 | Dusan .................. H04R 1/1083 381/74 |
| 2014/0192998 A1 | 7/2014 | Burnett |
| 2014/0270231 A1 | 9/2014 | Dusan |
| 2016/0255444 A1* | 9/2016 | Bange .................. H04R 25/405 381/313 |

FOREIGN PATENT DOCUMENTS

| | | |
|---|---|---|
| WO | 2011157856 A2 | 12/2011 |
| WO | 2012061151 A1 | 5/2012 |
| WO | 2015024602 A1 | 2/2015 |

\* cited by examiner

CLIP-ON MICROPHONE ASSEMBLY

The invention relates to a clip-on microphone assembly which is to be attached to the clothing of a user for generating an output audio signal corresponding to the user's voice and which comprises an audio signal processing unit with a beam former unit for processing the captured audio signals in a manner so as to create an acoustic beam. Such microphone assembly typically forms part of a wireless acoustic system; for example, the output audio signal of the microphone assembly may be transmitted to a hearing aid.

For hearing impaired people speech understanding in noise and/or over larger distance is a serious challenge. In such cases, the use of a wireless microphone that picks up the speaker's voice close to its source, i.e. close to the speaker's mouth, is very helpful, since the hearing aid on its own may not be able to provide the signal-to-noise ratio required for speech understanding by the wearer of the hearing aid.

In general, the purpose of a wireless microphone is to improve the signal-to-noise ratio of speech of a distant speaker in a noisy and/or reverberant environment. For this purpose, the wireless microphone assembly has to be placed close to the speaker's mouth. Further, wireless microphone assemblies typically have a certain directivity allowing to further attenuate environmental noise with regard to the desired speech.

Although a boom microphone in most cases offers the best performance, users tend to not like this solution for certain reasons. For example, most boom microphone systems require a complex fixation, for example on the ear, and thus are difficult to place. Further, since the boom microphone is placed close to the mouth, there may be concerns on hygiene. Also, the wearing style of a boom microphone typically is quite obtrusive.

Figure 1:
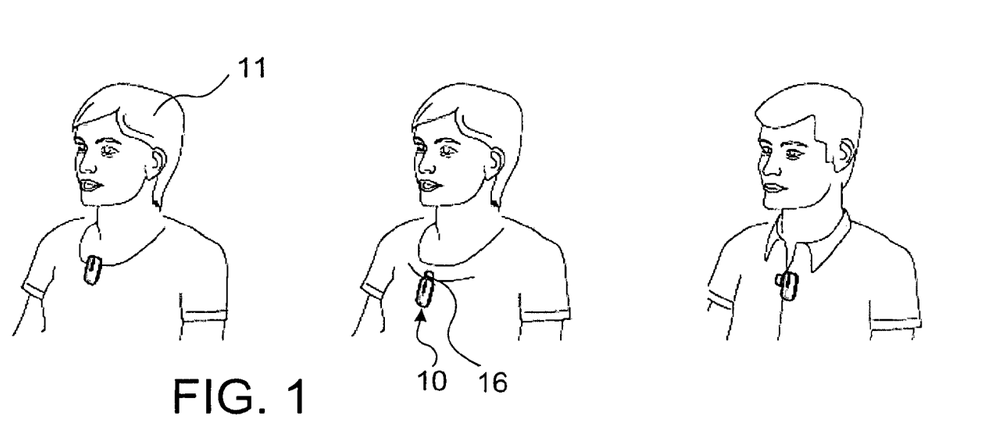
FIGS. 1 and 2 are illustrations of examples of use situations of a clip-on microphone assembly.

Hence, a more preferred alternative solution may be to use a clip-on microphone assembly which is attached through a clip-on mechanism to the clothing of the speaker. Typical wearing styles are shown in FIG. 1: the microphone assembly may be clipped on the collar (see left-hand part of FIG. 1), it may be clipped directly on the clothing (central part of FIG. 1) or it may be clipped between buttons (right-hand part of FIG. 1).

Figure 2:
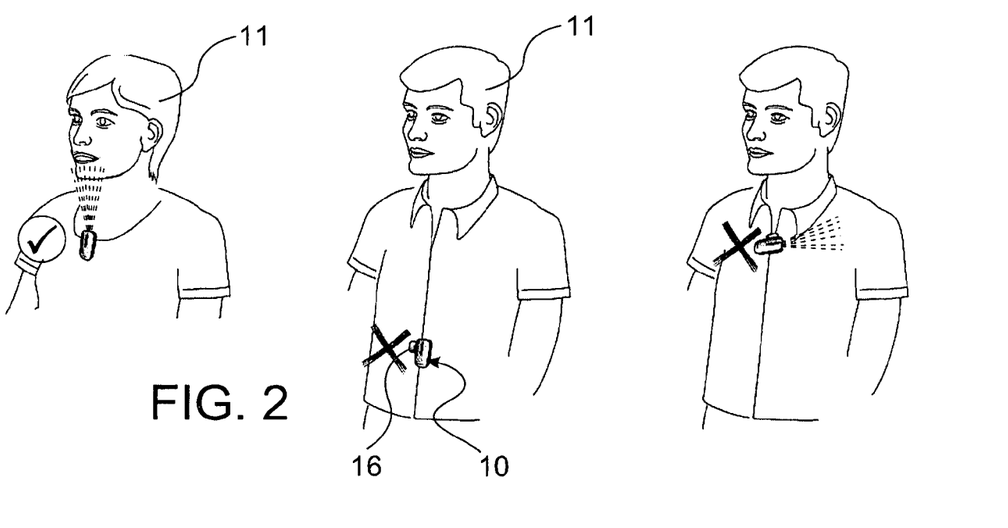

As mentioned before, the microphone assembly should be placed as close as possible to the mouth of the person. In addition, for microphone assemblies with directivity particular care has to be taken to correctly direct the microphone assembly to the speaker's mouth. In FIG. 2 three examples of placement of a directional microphone assembly are shown: The left-hand part of FIG. 2 illustrates a case in which the microphone assembly is correctly worn in the sense that it is oriented towards the mouth and is located close to the mouth; in the example shown in the center part of FIG. 2, the microphone assembly is placed too far away from the mouth; and in the example shown in the right-hand part of FIG. 2, the microphone assembly is placed close to the mouth but it is not pointing towards the mouth. Thus, for an unskilled user the correct microphone placement is a difficult task, even more in case that no direct acoustic feedback is available, for example in case that the speaker is not able to check his/her own voice pickup.

WO 2009/049646 A1 relates to a wireless hearing assistance system comprising a wireless microphone arrangement and two hearing aids, wherein the audio signal processing scheme applied in the audio signal processing in the microphone arrangement is selected according to the measured acceleration and spatial orientation of the microphone arrangement; selection of the audio signal processing scheme includes adjustment of the applied gain and activation/deactivation of an acoustic beamformer, wherein the direction of the beamformer may be automatically adjusted to the direction of the most intense sound source.

WO 2011/157856 A2 relates to a wireless microphone assembly which comprises an acceleration sensor for detecting a drop-down event of the microphone assembly in order to interrupt the audio signal output of the microphone assembly during a drop-down event.

U.S. Pat. No. 8,804,978 B2 relates to a mobile phone including a beamformer microphone arrangement, wherein the direction of the beamformer is adjusted according to the tilt angle of the mobile phone as determined by an accelerometer.

U.S. Pat. No. 8,150,063 B2 relates to a mobile phone comprising a beamformer microphone array and an orientation sensor which is used for adjusting the direction of the beamformer with regard to a stationary target audio source so as to compensate for the movement of the mobile phone as detected by the orientation sensor.

US 2014/0270231 A1 and US 2014/0093091 A1 relate to a hearing system comprising a headset formed by two earbuds, each comprising two microphones and an accelerometer, and a microphone array mounted at the headset wire. The headset wire microphones act as a beam former which is automatically steered towards the user's mouth as detected by the energy content in the captured audio signal; the accelerometers are used for detection of voiced speech.

U.S. Pat. No. 7,912,237 B2 relates to a pen-like wireless microphone arrangement for a hearing aid, comprising three microphones arranged in a row which are used as a beam former, wherein the beamforming action is controlled according to the measured orientation of the microphone arrangement; for example, the beamformer is switched off when a vertical orientation of the microphone assembly is detected, and it is switched on when horizontal orientation is detected.

WO 20151024602 A1 relates to a microphone arrangement comprising three microphones acting as a beamformer and an acceleration sensor for determining misplacement of the microphone arrangement; the arrangement further comprises speakers for music presentation, wherein the acceleration sensor may act as a remote control for switching between songs to be played upon detection of shaking motion.

U.S. Pat. No. 8,406,436 B2 relates to a microphone arrangement comprising a plurality of non-radially oriented directional microphones.

US 2014/0192998 A1 relates to a remote microphone arrangement for an earpiece, comprising two directional microphones and a voice activity detector with an accelerometer.

It is an object of the invention to provide for a clip-on microphone assembly which allows for convenient use while providing for a high signal-to-noise ratio of the output audio signal.

It is a further object to provide for a corresponding method for generating an audio output signal from a user's voice.

According to the invention, these objects are achieved by a microphone assembly as defined in claim 1 and a method as defined in claim 24, respectively.

The invention is beneficial in that, by determining an allowed angular sector of the direction of the acoustic beam according to the measured orientation of the microphone assembly and steering the direction of the acoustic beam within the allowed angular sector according to the determined direction of arrival of sound, the microphone assembly is able to optimize the signal-to-noise ratio ("SNR") of the output audio signal by automatically steering the direction of the acoustic beam towards the speaker's mouth, irrespective of the actual placement/orientation of the microphone assembly when attached to the speaker's clothing, provided that the microphone assembly is located relatively close to the user's mouth. This automatic adjustment makes the use of the microphone assembly convenient, since no particular care has to be taken when attaching the microphone assembly to the user's clothing; thus, also a relatively simple clip-on mechanism is sufficient.

Typically, the microphone assembly forms part of a wireless system comprising at least one ear-level hearing stimulation device, such as a hearing aid. In particular, the microphone assembly may be used by a teacher of a class of hearing impaired persons wearing hearing instruments.

It is to be understood if the microphone beam already points "by chance" into the right direction, in particular if the beam is relatively broad (this depends on the number of microphones), e.g. having a width covering approximately the allowed angular sector, no (further) angular movement (steering) of the beam may be necessary.

Preferred embodiments of the invention are defined in the dependent claims.

Hereinafter, examples of the invention will be illustrated by reference to the attached drawings, wherein.

Figure 3:
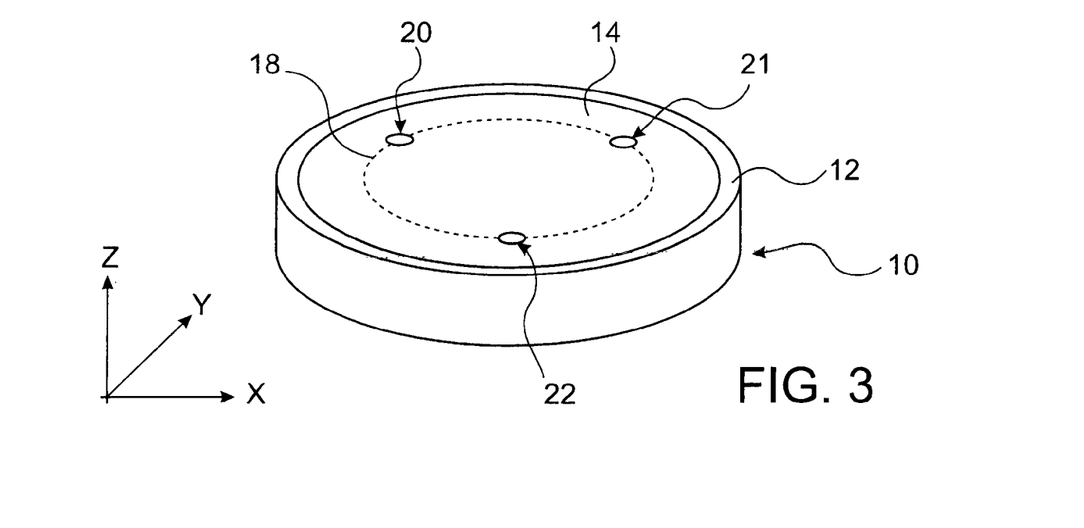
FIG. 3 is a schematic perspective view of an example of a microphone assembly according to the invention.

FIG. 3 is a schematic perspective example of a microphone assembly 10 comprising a housing 12 having an essentially circular cylindrical shape (with the height of the cylinder being much smaller than the diameter of the cylinder, resulting in a puck-like shape) having a first circular flat surface 14 and a second circular flat surface (not shown in FIG. 3) which is parallel to the first surface 14. The microphone assembly 10 comprises three microphones 20, 21, 22 which preferably are uniformly distributed on a circle (indicated at 18 in FIG. 3); however, the angle between adjacent microphones may be from 90 to 180 degrees, preferably from 110 to 130 degrees, with the sum of the three angles being 360 degrees, i.e. also variants are conceivable wherein the microphones 20, 21, 22 are not exactly uniformly distributed on the circle 18. The microphone assembly 10 further comprises a clip-on mechanism 16 (schematically shown in FIGS. 1 and 2, but not shown in FIG. 3) for attaching the microphone assembly to the clothing of a user at a position close to the user's mouth. The microphone assembly 10 is designed to be worn in such a manner that the two flat circular surfaces 14 are essentially parallel to the vertical direction.

In general, there may be more than three microphones. In an arrangement of four microphones, the microphones still may be distributed on a circle, preferably uniformly. For more than four microphones the arrangement may be more complex, e.g. five microphones may be ideally arranged as the figure five on a dice. More than five microphones preferably would be placed on a matrix configuration, e.g. a 2×3 matrix, 3×3 matrix, etc.

Figure 4:
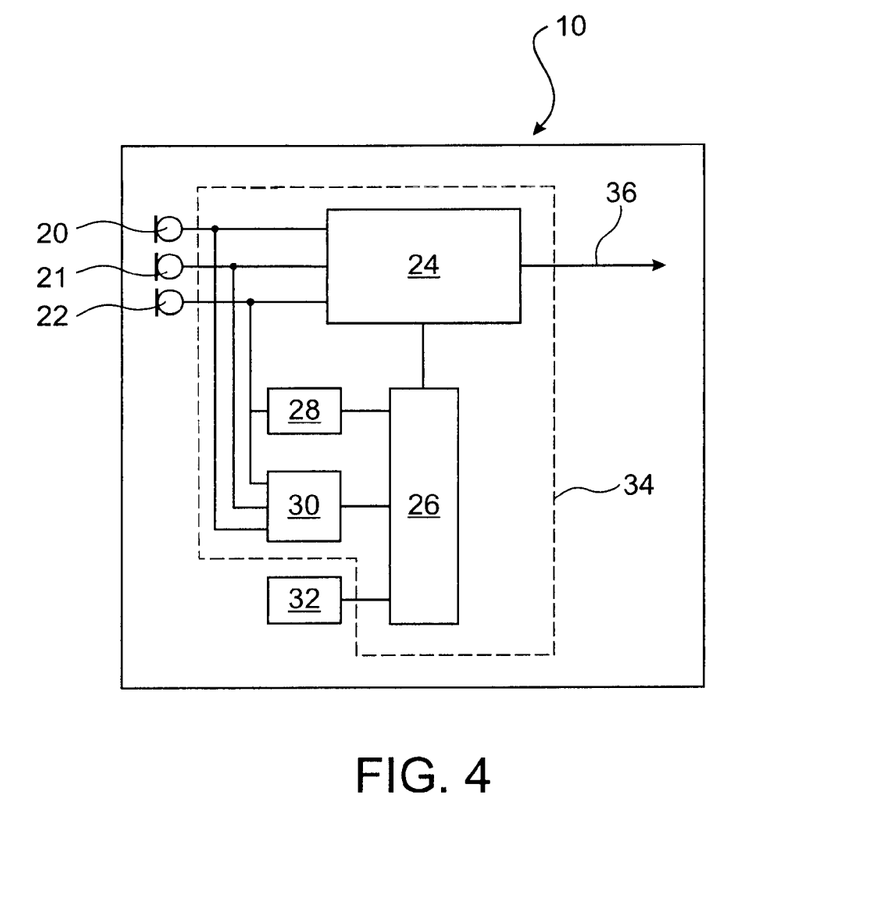
FIG. 4 is a block diagram of an example of a microphone assembly according to the invention.

A block diagram of an example of a microphone assembly is shown in FIG. 4, according to which the audio signal captured by the microphones 20, 21, 22 from the user's voice are supplied to a beamformer unit 24 which processes the captured audio signals in a manner so as to create an acoustic beam having a certain direction and a certain angular width. The beamformer unit 24 is controlled by a control unit 26 which receives input from a voice activity detector ("VAD") 28, a direction of arrival ("DOA") unit 30 and an acceleration sensor 32. The beamformer unit 24, the control unit 26, the VAD 28 and the DOA unit 30 form part of an audio signal processing unit 34 which serves to produce an output audio signal 36 from the audio signals captured by the microphones 20, 21, 22. The VAD 28 serves to detect the times when the user is speaking. This can be done, for example, based on a detection of an energy threshold of the acoustic signal captured by, for example, the microphone 22. The DOA unit 30 serves to determine the direction of arrival of sound by analyzing the audio signals captured by the microphones 20, 21, 22; for this purpose, different algorithms may be used, such as steered beamformers, subspace-based estimation or time delay estimate based methods.

The acceleration sensor 32 serves to generate an orientation signal by sensing gravitational acceleration in at least two orthogonal dimensions in the plane defined by the microphones 20, 21, 22 (which is parallel to the flat circular surface 14 of the housing 12; in the example of FIG. 3, this plane is the x-y-plane), so that the orientation of the microphones 20, 21, 22 with regard to the vertical direction can be determined.

When the microphone assembly 10 is switched on after having been attached to the user's clothing, the control unit 26 determines an allowed angular sector 40 with a center direction 42 being opposite to the direction 44 of gravity (vertical direction) as determined by the control unit 26 from the orientation signal supplied by the acceleration sensor 32. The angular width $2\alpha$ of the allowed beam forming sector 40 may be from 60 to 100 degrees, preferably 70 to 90 degrees, such as 80 degrees. As long as no voice activity is detected by the VAD unit 28, the control unit 26 may interrupt or attenuate the production of an output audio signal from the audio signals of the microphones 20, 21, 22 in order to avoid the pick-up of noise signals (usually it is desired to exclusively pick-up the user's voice).

Once voice activity has been detected by the VAD 28, the control unit 26 may start to use the direction of arrival signal provided by the DOA unit 30 in order to steer the direction of the acoustic beam generated by the beam former unit 24 within the allowed beamforming sector towards the sound source (the desired sound source is the mouth of the user). In other words, the beam former unit 24 will steer the direction of the acoustic beam towards the user's mouth. The width of the acoustic beam may be initially set to the width of 2α of the allowed angular sector 40.

Figure 6:
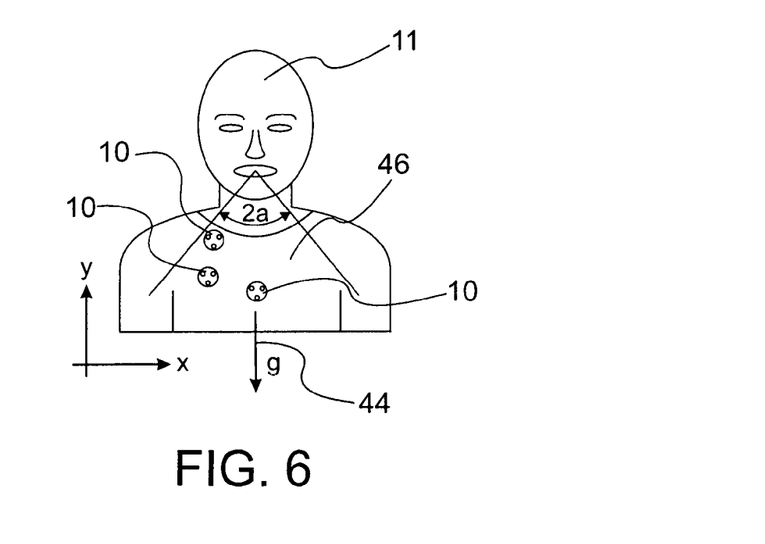
FIG. 6 is a schematic illustration of placement positions of a microphone assembly according to the invention at a user.

It can be seen from the schematic illustration shown in FIG. 6 that the angular width 2α of the allowed beam forming sector 40 should be selected such that the typical locations of placement of the microphone assembly 10 at the user's clothing fall within a sector 2*a* with regard to the user's mouth (this angular sector 2*a* is indicated at 46 in FIG. 6, with the central direction of the sector 46 being formed by the vertical direction 44), Thus, any microphone assembly 10 located within the sector 46 will "see" the user's mouth in a direction falling within the allowed beamforming sector 40 (having an angular width 2α).

Figure 5:
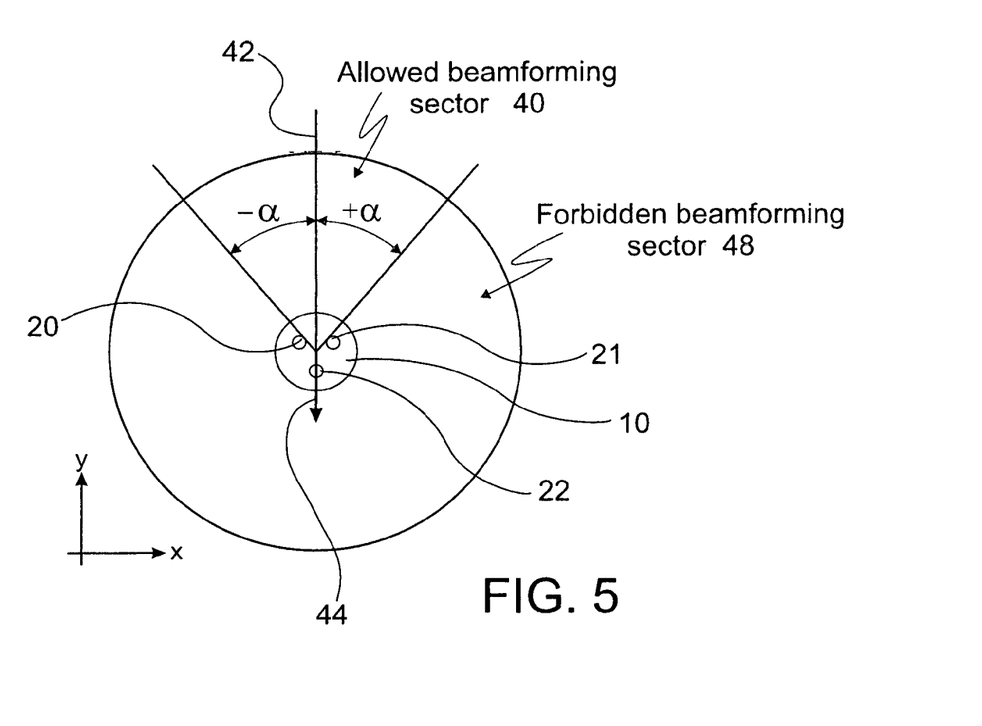
FIG. 5 is a schematic diagram illustrating an allowed beam forming sector created by a microphone assembly according to the invention.
Figure 8:
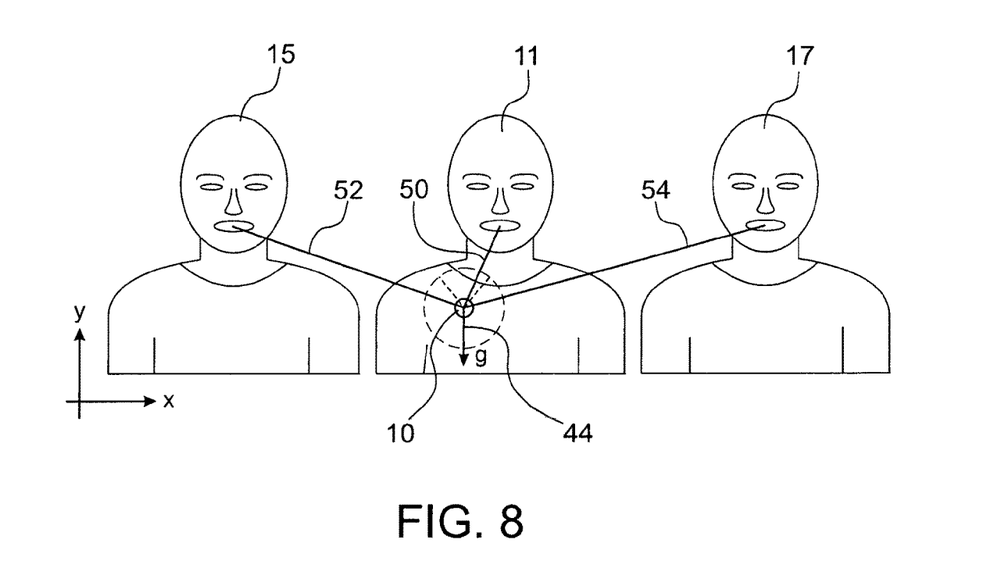
FIG. 8 is a schematic illustration of a specific use situation of a assembly according to the invention.

If the direction of arrival is found to fall within the forbidden beamforming sector 48 (see FIG. 5), it is likely that such sound is not from the voice of the user 11 wearing the microphone assembly 10, but rather is from the voice of another person 15, 17 standing close to the user 11. Such situation is schematically illustrated in FIG. 8, wherein the direction of the mouth of the user 11 with regard to the microphone assembly 10 falls within the allowed beamforming sector 40 (this direction is indicated at 50 in FIG. 8), whereas the directions of the mouth of the persons 15 and 17 with regard to the microphone assembly 10 falls within the forbidden beamforming sector 48 (these directions are indicated at 52 and 54, respectively, in FIG. 8). When a direction of arrival falling within the forbidden beamforming sector 48 is detected by the DOA unit 30, the control unit 26 may interrupt the production of an output audio signal, or it may at least significantly attenuate the output audio signal; in particular, the beam of the beamformer unit 24 in these cases will not be steered to a direction falling within the forbidden beamforming sector 48.

During operation of the microphone assembly 10 the control unit 26 may adjust the width of the acoustic beam as a function of at least one parameter determined by the audio signal processing unit 34 so as to optimize the SNR of the output audio signal. In particular, the width of the acoustic beam produced by the beam former unit 24 may be adjusted as a function of the determined direction of arrival and/or as a function of the variation of the determined direction of arrival with time. For example, the width of the acoustic beam may be reduced with decreasing variation of the determined direction of arrival with time (decreasing variation indicates more stable conditions).

Further, the beam width may depend on the VAD speech energy level and the voice activity. For example, if the speech energy level is high or if the VAD is triggered frequently or over longer periods, the determination of the DOA is also more stable and the beam thus may be narrower. However, in case the VAD is only rarely triggered, the beam should rather be broad.

Figure 7:
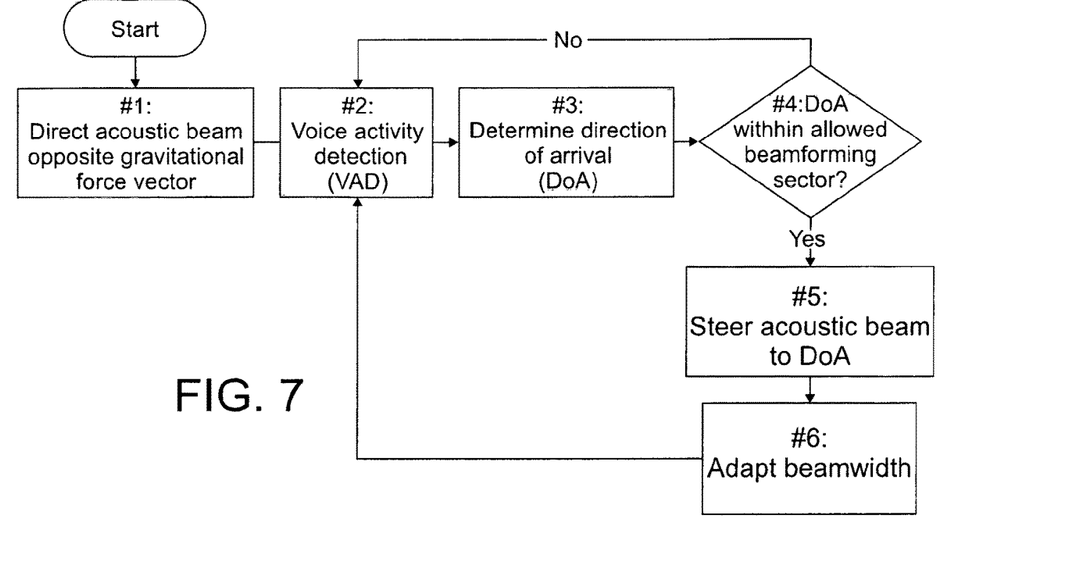
FIG. 7 is a flow diagram illustrating an example of a method of operating a microphone assembly according to the invention.

A flow diagram of the operation of the microphone assembly 10 is shown in FIG. 7. Typically, the steps 2 to 6 of FIG. 7, in particular the determining of the direction of arrival, the steering of the direction of the beam and the adaptation of the width of the beam, is repeated on a regular basis, provided that voice activity has been detected by the VAD 28. In other words, the algorithm shown in FIG. 7 loops continuously through steps 2 to 6 for an optimal operation of the microphone assembly 10, whereby, in particular, head movement and microphone placement in different positions can be compensated for.

It is to be mentioned that audio signal processing in the audio signal processing unit 34 typically includes not only acoustic beamforming but also, for example, pre-amplification, equalizing, feedback cancelling, and automatic gain control.

According to one embodiment, the microphone assembly 10 may be designed as (i.e. integrated within) an audio signal transmission unit for transmitting the audio signal output 36 via a wireless link to at least one audio signal receiver unit or, according to a variant, the microphone assembly 10 may be connected by wire to such an audio signal transmission unit, i.e. the microphone assembly 10 in these cases acts as a wireless microphone. Such wireless microphone assembly may form part of a wireless hearing assistance system, wherein the audio signal receiver units are body-worn or ear level devices which supply the received audio signal to a hearing aid or other ear level hearing stimulation device. Such wireless microphone assembly also may form part of a speech enhancement system in a room.

In such wireless audio systems, the device used on the transmission side may be, for example, a wireless microphone assembly used by a speaker in a room for an audience or an audio transmitter having an integrated or a cable-connected microphone assembly which is used by teachers in a classroom for hearing-impaired pupils/students. The devices on the receiver side include headphones, all kinds of hearing aids, ear pieces, such as for prompting devices in studio applications or for covert communication systems, and loudspeaker systems. The receiver devices may be for hearing-impaired persons or for normal-hearing persons; the receiver unit may be connected to a hearing aid via an audio shoe or may be integrated within a hearing aid. On the receiver side a gateway could be used which relays audio signal received via a digital link to another device comprising the stimulation means.

Such audio system may include a plurality of devices on the transmission side and a plurality of devices on the receiver side, for implementing a network architecture, usually in a master-slave topology.

In addition to the audio signals, control data is transmitted bi-directionally between the transmission unit and the receiver unit. Such control data may include, for example, volume control or a query regarding the status of the receiver unit or the device connected to the receiver unit (for example, battery state and parameter settings).

Figure 9:
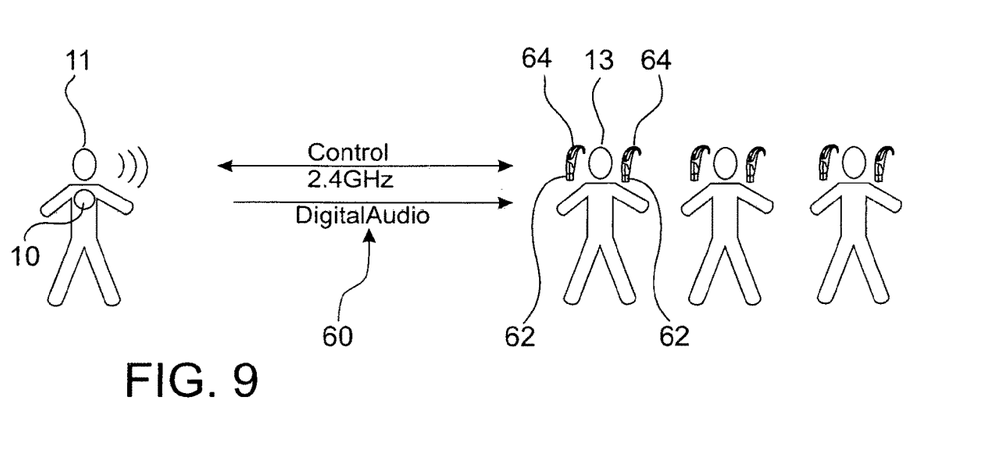
FIG. 9 is an example of a use of a wireless hearing assistance system using microphone assembly according to the invention.

In FIG. 9 an example of a use case of a wireless hearing assistance system is shown schematically, wherein the microphone assembly 10 acts as a transmission unit which is worn by a teacher 11 in a classroom for transmitting audio signals corresponding to the teacher's voice via a digital link 60 to a plurality of receiver units 62, which are integrated within or connected to hearing aids 64 worn by hearing-impaired pupils/students 13. The digital link 60 is also used to exchange control data between the microphone assembly 10 and the receiver units 62. Typically, the microphone arrangement 10 is used in a broadcast mode, i.e. the same signals are sent to all receiver units 62.

Figure 10:
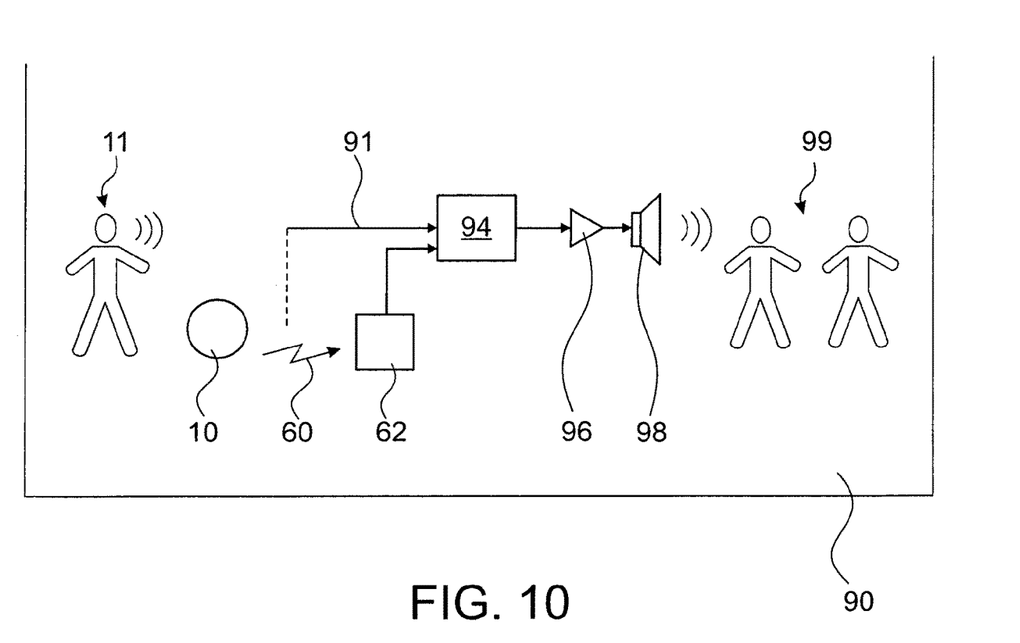
FIG. 10 is a block diagram of a speech enhancement system using a microphone assembly according to the invention.

In FIG. 10 an example of a system for enhancement of speech in a room 90 is schematically shown. The system comprises a microphone assembly 10 for capturing audio signals from the voice of a speaker 11 and generating a corresponding processed output audio signal. The microphone assembly 10 may include, in case of a wireless microphone assembly, a transmitter or transceiver for establishing a wireless—typically digital—audio link 60. The output audio signals are supplied, either by a wired connection 91 or, in case of a wireless microphone assembly, via an audio signal receiver 62, to an audio signal processing unit

94 for processing the audio signals, in particular in order to apply a spectral filtering and gain control to the audio signals (alternatively, such audio signal processing, or at least part thereof, could take place in the microphone assembly 10). The processed audio signals are supplied to a power amplifier 96 operating at constant gain or at an adaptive gain (preferably dependent on the ambient noise level) in order to supply amplified audio signals to a loudspeaker arrangement 98 in order to generate amplified sound according to the processed audio signals, which sound is perceived by listeners 99.

The invention claimed is:

1. A clip-on microphone assembly, the assembly comprising:
   a clip-on mechanism for attaching a microphone assembly to an object or person;
   three microphones configured to capture audio signals, wherein the three microphones are arranged in a plane;
   an acceleration sensor configured to generate an orientation signal by sensing gravitational acceleration in two orthogonal dimensions of the plane;
   an audio signal processing unit configured to produce an output audio signal from the captured audio signals, comprising:
   a beamformer unit configured to create an acoustic beam having a direction and configured to process the captured audio signals;
   a direction of arrival (DOA) unit configured to determine a direction of arrival of sound by analyzing the captured audio signals;
   a control unit configured to control the beamforming unit, wherein the control unit is adapted to determine an allowed angular sector of the acoustic beam based on the orientation signal and to steer the direction of the acoustic beam within the allowed angular sector based on the determined direction of arrival,
      wherein the control unit is configured to interrupt production of an output audio signal or to attenuate the output audio signal when the determined direction of arrival of sound is outside the allowed angular sector, and
      wherein the control unit is configured to prevent the beamformer unit from steering towards the direction of the arrival of sound when the direction of arrival of sound is outside the allowed angular sector of the acoustic beam.

2. The assembly of claim 1, wherein the control unit is adapted to determine the allowed angular sector as having a center direction opposite the direction of gravity as determined from the orientation signal.

3. The assembly of claim 2, wherein an angular width of the allowed angular sector is between 60 to 100 degrees.

4. The assembly of claim 1, wherein the control unit is adapted to reduce the width of the acoustic beam with decreasing variation of the determined direction of arrival with time.

5. The assembly of claim 1, wherein the control unit is adapted to reduce the width of the acoustic beam with an increasing speech energy detected by a voice activity detector.

6. The assembly of claim 1, wherein the control unit is adapted to initially set the width of the acoustic beam to the width of the allowed angular sector.

7. The assembly of claim 6, wherein the repetition rate of the determining of the direction of arrival and the steering of the direction of the beam is at least every 10 seconds.

8. The assembly of claim 1, wherein the audio signal processing unit further comprises a voice activity detector, and wherein the control unit is adapted to start the determining of the direction of arrival and the steering of the direction of the beam when the voice activity detector detects voice activity.

9. The assembly of claim 8, wherein the control unit is adapted to interrupt or attenuate the production of an output audio signal when the voice activity detector does not detect voice activity.

10. The assembly of claim 8, wherein the control unit is adapted to adjust a width of the acoustic beam as function of at least one parameter determined by the audio signal processing unit to optimize the signal to noise ratio of the output audio signal.

11. The assembly of claim 10, wherein the control unit is adapted to adjust the width of the acoustic beam as a function of at least one of following:
    a determined direction of arrival;
    the variation of the determined direction of arrival with time; or
    the speech energy as detected by a voice activity detector and a level of activity of the voice activity detector.

12. The assembly of claim 10, wherein the control unit is adapted to repeat the adjustment of the width of the acoustic beam on a regular basis.

13. The assembly of claim 8, wherein the control unit is adapted to the width of the acoustic beam with an increasing level of activity of the voice activity detector.

14. The assembly of claim 8, wherein the control unit is adapted to repeat the determining of the direction of arrival and the steering of the direction of the beam on a regular basis, provided that voice activity has been detected by the voice activity detector.

15. The assembly of claim 8, wherein the microphones are distributed on a circle, and wherein each angle between adjacent microphones is from 90 to 180 degrees, with the sum of the three angles being 360 degrees.

16. The assembly of claim 8, wherein the microphones are distributed approximately on a circle, and wherein each angle between adjacent microphones being from 110 to 130 degrees.

17. The assembly of claim 1, wherein the microphone assembly comprises a housing having a circular cylindrical shape, and wherein the clip-on mechanism is designed such that, when the microphone assembly is configured to clip to cloths.

18. A method for generating an output audio signal, the method comprising:
    generating, by an acceleration sensor, an orientation signal by sensing gravitational acceleration in two orthogonal dimensions for a microphone assembly,
       wherein the microphone assembly includes three microphones;
    determining a direction of gravity relative to the microphone assembly from the orientation signal;
    capturing audio signals via the microphone assembly;
       processing the captured audio signals by:
       determining an allowed angular sector of an acoustic beam partially based on the determined direction of gravity,
       determining a direction of arrival of sound by analyzing the captured audio signals;
       steering the direction of the acoustic beam within the allowed angular sector according to the determined direction of arrival;

interrupting production of an output audio signal or attenuating the output audio signal when the determined direction of arrival is outside the allowed angular sector;

preventing steering towards the direction of the arrival of sound when the direction of arrival of sound is outside the allowed angular sector; and providing the output audio signal based on the processed captured audio signals.

19. The method of claim 18, the method further comprising: transmitting wirelessly the output signal to a hearing device, wherein the three microphones are distributed on a circle, and wherein an angle between adjacent microphones is between 90 to 180 degrees.

* * * * *